United States Patent [19]
Lueck

[11] Patent Number: 5,663,886
[45] Date of Patent: Sep. 2, 1997

[54] MACHINE TOOL GRAPHICAL DISPLAY DEVICE FOR DISPLAYING MACHINE LOAD RELATIVE TO TOOL POSITION

[75] Inventor: Keith W. Lueck, Fenton, Mo.

[73] Assignee: Sunnen Products Company, St. Louis, Mo.

[21] Appl. No.: 460,674

[22] Filed: Jun. 2, 1995

[51] Int. Cl.⁶ .............................. G06F 19/00; G06G 7/64; G06G 7/66
[52] U.S. Cl. ............................................... 364/474.22
[58] Field of Search ................... 364/474.12, 474.16, 364/474.17, 474.22, 474.26

[56] References Cited

U.S. PATENT DOCUMENTS

| | | | |
|---|---|---|---|
| 4,887,221 | 12/1989 | Davis et al. | 374/474.23 |
| 5,061,887 | 10/1991 | Miyata et al. | 318/568.25 |
| 5,175,688 | 12/1992 | Sasaki et al. | 364/474.22 |
| 5,317,518 | 5/1994 | Fujita et al. | 364/474.26 |
| 5,377,117 | 12/1994 | Yamamoto | 364/474.22 |
| 5,471,394 | 11/1995 | Matsumura et al. | 364/474.26 |
| 5,479,354 | 12/1995 | Husslein | 364/474.22 |

*Primary Examiner*—Paul P. Gordon
*Assistant Examiner*—Monica Lewis
*Attorney, Agent, or Firm*—Haverstock, Garrett & Roberts

[57] ABSTRACT

A machine tool display device provides a continuous real time display of a machine tool load as a function of position of a tool relative to a work surface being machined. Position is displayed on a first axis and load is displayed on a second axis perpendicular to the first axis. A mirror image of the display may be provided about a third axis perpendicular to the first axis so that a cross sectional representation of the working surface is displayed. The machine tool includes means for manual or automatic adjustment of the position of the tool relative to the work surface in order to achieve a predetermined final work surface profile.

44 Claims, 6 Drawing Sheets

MACHINE TOOL GRAPHICAL DISPLAY DEVICE FOR DISPLAYING MACHINE LOAD RELATIVE TO TOOL POSITION

FIELD OF THE INVENTION

This invention relates generally to display means for monitoring a machine tool process and more particularly, to a graphical display means for monitoring and enabling better control of the profile of a working surface as it is being machined.

BACKGROUND OF THE INVENTION

There are in existence numerous devices for machining working surfaces in workpieces, including grinding machines and honing machines. In many applications it is desirable to apply a tool to such surfaces to remove material from the surfaces until a particular contour or profile is reached, such as a cylindrical contour in the case of the honing of engine block cylinders.

Some machine tool devices include visual displays of instantaneous machine load, such as the display disclosed in U.S. Pat. No. 4,887,221 which is assigned to the assignee of the present application. The displayed load is the load on the machine tool motor and is typically displayed, in either analog or digital form, on a percentage scale ranging from zero to one hundred percent, where one hundred percent represents a recommended maximum load for the machine tool motor. Some displays have also included indicator means, such as a flashing light, for signaling when one end of a stroke movement has been reached. However, as described below, none of the aforementioned displays have provided sufficient information to allow machine tool operators to easily determine the contour or profile of a working surface as it is being machined.

The instantaneous load of the machine tool motor will vary as the profile of the working surface varies. For example, in honing operations, when honing tight spots, or axial bore regions having a smaller diameter than the rest of the bore, a honing tool encounters more resistance and therefore requires more power to work its way through the tight spot. Accordingly, when the honing tool is honing a smaller diameter region, the instantaneous load of the honing motor is higher than when the honing tool is honing at larger diameter regions of the bore. Thus, the displayed instantaneous load is higher when the honing tool is honing the smaller diameter bore regions. Similarly, in other types of machine tool operations, such as grinding operations, the machine tool load will vary with the profile of the working surface being machined.

When operating machine tool devices that include the aforementioned displays, machine operators must separately observe both the instantaneous load and the stroke position in order to determine where the profile of the working surface varies. The operators then compensate for such profile variations. In particular, in honing applications, the operator changes the location of the workpiece with respect to the honing tool by moving the workpiece along the stroke axis or by moving the honing tool along the stroke axis, causing more honing to take place in the smaller diameter regions of the bore. In some machines, the operator can also vary the stroke length. Further, the operator can pause or dwell the stroking action of the honing tool while the tool is in the smaller diameter regions so that more material is removed from those regions. Thus, the operator is able to control the honing operation in order to achieve the desired cylindrical bore profile.

Problems with this instantaneous type of load display and operator control exist. For example, the detailed observation required for the machine operator to separately observe both instantaneous load and stroke position can result in mistakes or variations in working surface profiles based on the varying levels of operator skill, experience, and attention. Further, many machine tool devices include only a single motor for powering both tool rotation and tool stroking. In these single motor devices, the power required to reverse the stroking direction of the tool may register as a high load point on the instantaneous load display and can be mistaken for a working surface profile variation. Accordingly, machine operators must learn to distinguish between high load readings caused by the changing stroke direction and those caused by variations in the profile of the working surface. Based on these difficulties, operators cannot easily adjust to operating new or different machine tool devices. Thus, the skill of the operator and the mount of operator attention and experience contribute substantially to the cost of machining workpieces and to the accuracy and uniformity of the parts produced.

Recently, the workplace environment has seen a trend towards multi-tasking. More and more often, each worker is required to learn and perform more than one job in a particular working environment in order to increase the overall efficiency of the workplace. The prior art machine tools described above do not facilitate this trend due to the difficulty involved in learning to operate the machine tools and the difficulty involved in achieving workpiece uniformity as between different machine operators.

Accordingly, it is desirable and advantageous to provide a machine tool which allows a machine operator to easily determine the profile of a working surface being machined. It also is desirable and advantageous to provide a machine tool which effectively reduces the probability of incorrect or varying working surface profiles.

A principal object of the present invention is to provide a machine tool display of the profile of a working surface as it is being machined.

Another object of the present invention is to reduce the time and cost associated with training machine tool operators.

Another object of the present invention is to provide a machine tool graphical display which represents the profile of a working surface as it is being machined.

Another object of the invention is to provide a machine tool having a stroking and rotating tool wherein tool rotation is powered by a spindle motor which is independent of tool stroking.

Another object of the present invention is to provide a machine tool graphical display which continuously displays stroke position on one axis and machine tool load on an axis perpendicular to the stroke position axis.

Another object of the present invention is to provide a machine tool graphical display which continuously displays tool position on a first axis as a function of machine tool load on a second axis perpendicular to the first axis, and a mirror image of the relationship about a third axis which is parallel to the first axis so that the working surface profile is displayed.

SUMMARY OF THE INVENTION

These and other objects and advantages of the invention are attained by a device which, in one embodiment, is a machine tool display device that provides a continuous, real time display of a graphical representation of a working surface profile during machining of the working surface. The machine tool includes a position sensor that senses a position of a tool with respect to the working surface and a load sensor that senses a tool load such as a load on a motor. Both the position sensor and the load sensor are connected to a processing means, such as a microprocessor, which is attached to and controls a visual output device which is capable of displaying information in a two coordinate system. The processing means coordinates the data received from the position sensor and the load sensor and sends an output signal to the visual output device so that the display provided is a continuous display of load as a function of position, the load displayed on one axis verses tool position on an axis perpendicular to the load axis. The resultant graphical display represents a cross-sectional profile of the working surface as it is being machined.

The present invention enables a machine tool operator to easily determine the profile of a working surface as it is being machined. Further, the present invention has many advantages over prior art machine tools and display devices, such as greater ease with which an operator can determine the working surface profile, greater accuracy in making such determinations, increase in the uniformity of machined workpieces, and reduction in the skill level, experience, and training time required for machine tool operators. These advantages are apparent from the description of the present invention in the context of a honing operation.

The display device of the present invention is well suited for use in honing machines. However, it is contemplated that the display device of the present invention is useful in numerous types of machine tool devices and can be incorporated in such devices.

In a honing operation, a honing tool located at the end of a spindle arm is simultaneously rotated within a bore and stroked axially along the length of the bore. As the honing tool rotates and strokes axially, it also engages the interior surface of the bore, removing material therefrom. Two motors are provided. A stroking motor for powering the axial stroking of the honing tool and a spindle motor for powering the rotation of the honing tool. This separate motor configuration allows the power or load associated with rotation of the honing tool to be isolated from the power or load associated with the stroking of the honing tool.

In Vertical honing applications, the display device of the present invention provides a continuous, real time display of sensed spindle motor load verses sensed axial stroke position. The position sensor senses the axial position of the honing tool within the bore and the load sensor senses the load on the spindle motor. Various known position sensing devices and load sensing devices can be used for these purposes. Each sensor is connected to the microprocessor or other display driver which coordinates the data received from the two sensors and controls the visual output device. The microprocessor is programmed to drive the visual output device to display spindle motor load on a horizontal axis verses axial stroke position on a vertical axis as well as a mirror image of the relationship about a second vertical axis. The resultant graphical display represents a cross-sectional profile of the bore as it is being honed.

Machine operators can utilize the graphical display during a honing operation to easily achieve a predetermined final profile of the bore. For example, when honing an engine block cylinder wherein the desired final profile of the cylinder is cylindrical, smaller diameter regions of the cylinder are represented in the graphical display so that the machine operator can easily recognize them. Further, the display continuously changes in real time as the honing tool strokes so that the operator knows the axial position of the honing tool by watching the display. The machine operator then adjusts the axial position of the engine block, adjusts the stroking action of the honing tool, or pauses the axial stroking of the honing tool in the smaller diameter regions of the bore. By controlling the honing operation in this fashion, the operator causes additional material to be removed from the interior surface of the bore in the smaller diameter regions. The diameter of the region is thereby increased resulting in a more consistent diameter along the axial length of the bore which is accordingly reflected in the display. The graphical display increases the ease of machine operation as well as the ability of the machine operator to attain the predetermined final bore profile.

It is contemplated that the display device can be incorporated in vertical honing machines, horizontal honing machines, vertical grinding machines, horizontal grinding machines, and other machine tool devices in which determining the profile of the working surface of a workpiece is desirable. It is understood that in some applications of the present invention it may be desirable to reverse the graphical display so that load is displayed on the vertical axis and position is displayed on the horizontal axis. Further, a computer controlled machine can be programmed to automatically respond to the load sensor data and position sensor data in order to achieve the predetermined final profile of the working surface.

The advantages of the present invention will become apparent to those skilled in the art after considering the following description in conjunction with the accompanying drawings.

DETAILED DESCRIPTION OF THE DRAWINGS

The present invention relates to a novel display device for use in various types of machine tools, including honing machines and grinding machines. Throughout the description of the aforementioned drawings the display device is described in terms of its application to honing machines and, more particularly to vertical honing machines used to hone bores such as engine block cylinders. The vertical honing machine application of the present invention is intended for illustrative purposes.

Figure 1:
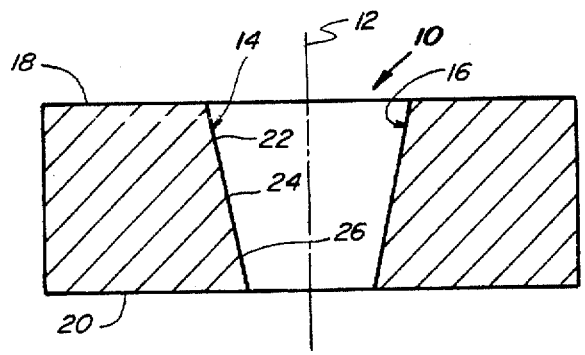
FIG. 1 is a cross-sectional profile of a bore in a workpiece.

FIG. 1 illustrates a cross-sectional view of an engine cylinder bore 10 with a vertical axis 12. An interior surface of bore 10 is represented by profile sidewalls 14 and 16. A desired final profile for bore 10 is cylindrical wherein sidewalls 14 and 16 are substantially parallel. However, as illustrated, bore 10 tapers from a top surface 18 to a bottom surface 20, having a larger diameter near top surface 18 than near bottom surface 20. The amount of taper illustrated is exaggerated for ease of understanding. Three positions along the axial length of bore 10 are indicated at 22, 24, and 26, first position 22 having a larger diameter than second position 24, and second position 24 having a larger diameter than third position 26. During a honing operation, it is desirable to remove material from the bore interior surface so that first, second, and third axial positions 22, 24, and 26 each have the same diameter when the honing operation is completed. In order to achieve this final profile, more material must be removed from smaller diameter bore positions than from larger diameter bore positions. The display device of the present invention is intended to simplify this task for a honing machine operator as compared to prior art display devices as described below.

Figure 2A:
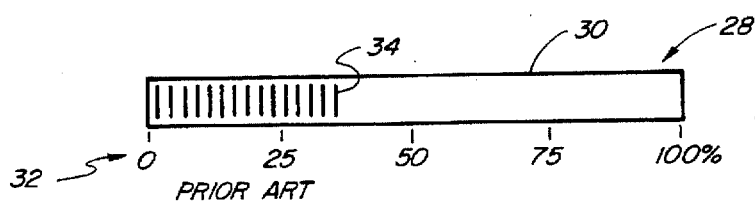
FIG. 2A is an illustration of a prior art display instantaneous load at a first axial bore position of FIG. 1.
Figure 2B:
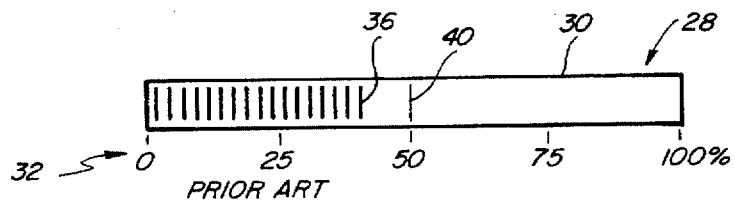
FIG. 2B is an illustration of the prior art display of instantaneous load at a second axial bore position of FIG. 1.
Figure 2C:
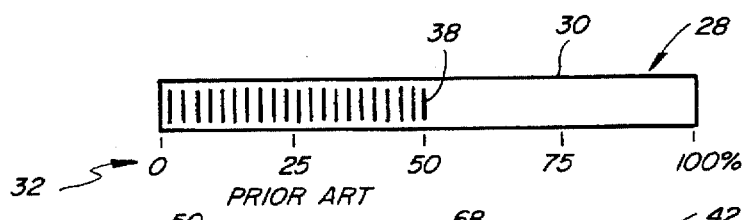
FIG. 2C is an illustration of the prior art display of instantaneous load at a third axial bore position of FIG. 1.

FIGS. 2A–2C illustrate a prior art honing machine display 28. Display 28 includes a horizontal digital display screen 30 and a corresponding horizontal scale 32 ranging from 0% to 100%, where the scale values represent a percentage of maximum recommended load for a particular honing machine. In FIG. 2A, a display value 34 is representative of an instantaneous load of the honing machine when a honing tool is located at bore first position 22 of FIG. 1. In FIG. 2B a display value 36 is representative of an instantaneous load of the honing machine when the honing tool is located at bore second position 24 of FIG. 1. Similarly, in FIG. 2C, a display value 38 is representative of an instantaneous load of the honing machine when the honing tool is located at bore third position 26 of FIG. 1. As shown, the instantaneous honing machine load is greater when the honing tool is located at smaller diameter bore positions. Display 28 may also include a display of peak load 40 as shown in FIG. 2B. Peak load 40 represents the highest load value for a stroking sequence.

When operating the honing machine including display 28 of FIGS. 2A–2C, machine operators must separately observe both instantaneous load readings 34, 36, 38 and axial stroke positions in order to determine where the bore profile varies. Detailed observation is required on the part of the machine operator to separately observe both instantaneous load and stroke position and a lack of attention can result in mistakes or variations in final bore profiles. The machine operator can also observe peak load 40 of display 28 and try to minimize the variation of the load away from peak 40 in order to achieve a cylindrical bore. Further, some known prior art honing machines have only a single motor for powering both tool rotation and tool stroking. In these single motor honing machines, the power required to reverse the stroking direction of the tool often registers as a high load point on the instantaneous load display and can be mistaken for a smaller diameter region of bore 10. Accordingly, machine operators must learn to distinguish between high load readings caused by the changing stroke direction and those caused by variations in the profile of bore 10.

Figure 3:
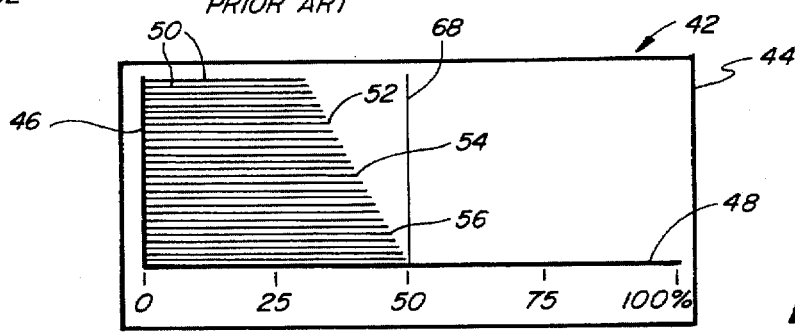
FIG. 3 is a an illustration of a display according to one embodiment of the present invention.

The display device of the present invention effectively eliminates these problems and is therefore advantageous over prior art display 28. FIG. 3 illustrates a display 42 according to one embodiment of the present invention. A display screen 44 includes a vertical axis 46 representative of the axial length of bore 10 of FIG. 1 and a horizontal axis 48 representative of load ranging from 0% to 100% of maximum recommended load. As opposed to display 28 of FIGS. 2A–2C, display 42 continuously displays instantaneous load lines 50 for numerous positions along the axial length of bore 10. In particular, instantaneous load values at positions 52, 54, and 56, corresponding to first, second, and third positions 22, 24, and 26 respectively of FIG. 1, are displayed, along with numerous positions therebetween. The resultant display effectively represents a profile of the bore sidewall 14 of FIG. 1.

Figure 4:
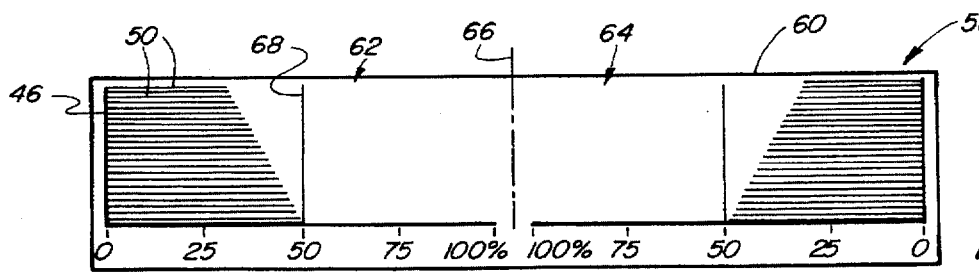
FIG. 4 is an illustration of a display according to an alternative embodiment of the present invention.

An alternative display 58 is illustrated in FIG. 4. Display 58 includes a display screen 60 having first and second display areas 62 and 64 separated by imaginary axis 66 which corresponds to bore axis 12 of FIG. 1. First display area 62 includes a display identical to that of FIG. 3. Second display area 64 provides a mirror image of first display area 62 around imaginary axis 66. The resultant display effectively represents a cross-sectional profile of bore 10 of FIG. 1.

The displays 42, 58 may also include a vertical peak load line 68 corresponding to the highest load value on the display. Vertical peak load line 68 is plotted one per stroke and enhances the operators ability to perceive small differences in the horizontal lengths of load lines 50.

Each instantaneous load line 50 in FIG. 3 and FIG. 4 corresponds to a particular axial bore position represented by position axis 46. Load lines 50 are shown vertically spaced from each other for clarity but may be displayed in adjacent fashion giving the appearance of a continuous surface. The number of load lines 50 displayed is dependent on the number of axial positions at which load is measured. Furthermore, displays according to FIGS. 3 and 4 are provided in real time and thus simplify the task of operator identification of bore profile variances. Displays 42, 58 change in real time. As the honing tool strokes, the axial position where the displayed load is changing is indicative of the axial position of the honing tool at that particular instant. Accordingly, machine operators need only observe display 42 or 58 when performing a honing operation and consequently the skill and attention level required of operators is reduced and the ability of operators to uniformly hone numerous parts is increased as described in greater detail below.

Figure 5:
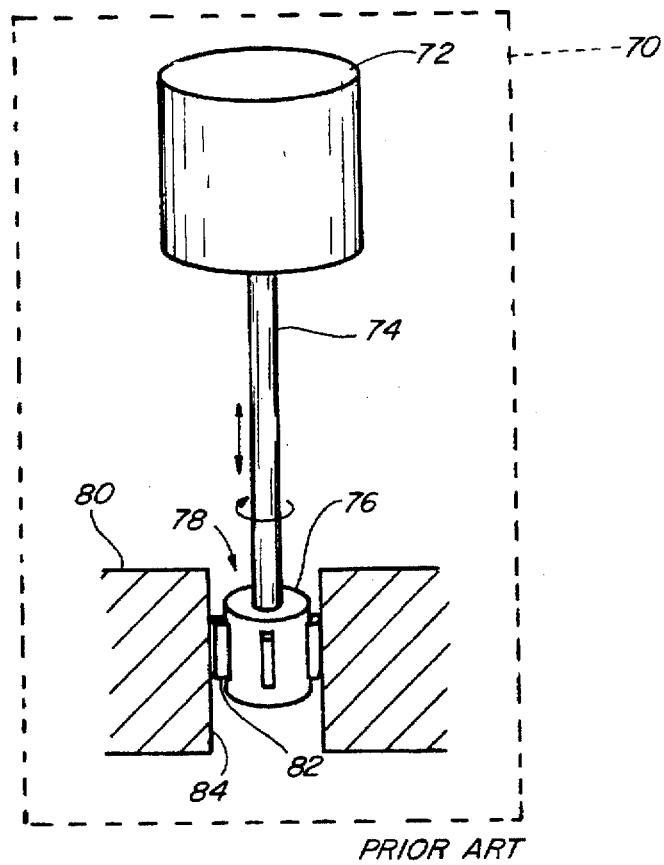
FIG. 5 is a simplified illustration of a typical vertical honing machine.

FIG. 5 is a partial illustration of a typical vertical honing machine 70. Honing machine 70 includes a spindle motor 72 operatively connected to an arm 74 having a honing tool 76 secured thereto and located within a bore 78 in an engine block 80. During a honing operation, honing tool 76 is simultaneously rotated within bore 78 and stroked axially, along the length of bore 78. As honing tool 76 rotates and strokes axially, abrasive stones 82, or other abrasive honing material, engage bore interior surface 84, removing material therefrom. It is contemplated that honing tool 76 may take the form of various known bore honing tools.

As honing tool 76 rotates and strokes axially, the machine tool operator observes the display of the present invention. Smaller diameter bore regions are compensated for by axially moving engine block 80 so that more honing takes place in such regions. Similarly, the stroking action of honing tool 76 can be adjusted so that more honing takes place in the smaller diameter regions or the stroking action can be paused in the smaller diameter regions. The axial position of honing tool 76 within bore 78 is represented by the area of the display which is changing so that the operator knows when honing tool 76 is located at the smaller diameter regions. Pausing the stroking action of honing tool 76 may be achieved by pressing a dwell button. Display devices according to the present invention enable an operator to determine, observe, and compensate for bore profile variations with greater accuracy and consistency over prior art display devices due to the graphical representation of the bore profile.

Spindle motor 72 powers the rotation of honing tool 76 and a separate stroking motor, not shown, powers the axial stroking of honing tool 76. However, it is contemplated that a single motor could be used for both rotation and stroking. Various known motors can be used to power spindle rotation or axial stroking such as electric motors, hydraulic motors, or pneumatic motors.

Figure 6:
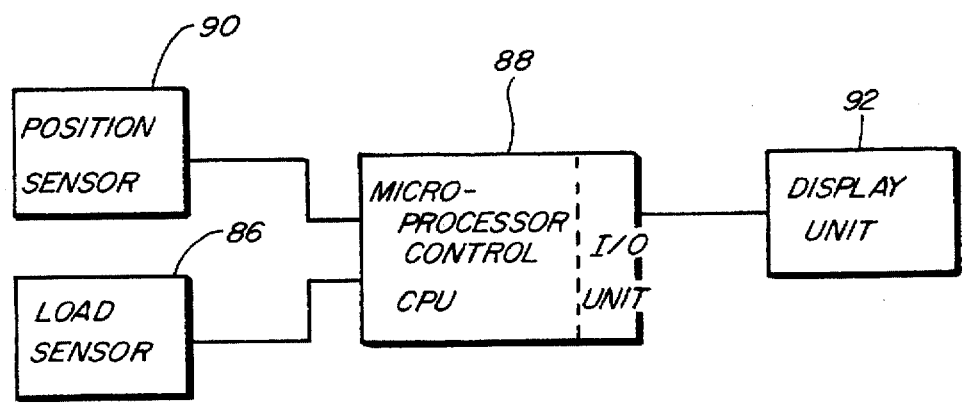
FIG. 6 is a high level block diagram of an implementation of the display device of the present invention.

FIG. 6 illustrates in block diagram form an implementation of the display device of the present invention. A load sensor 86 communicates a sensed load to microprocessor 88 which acts as a display driver. Numerous known sensing devices can be used such as power or current sensors including, but not limited to, a one to three element Watt transducer, a current transformer, a Hall-effect current/power sensor, or an auxiliary output from a motor drive controller which infers load on the motor by monitoring an internal signal. Other types of sensors are also contemplated, such as mechanical power or torque sensors including, but not limited to, a strain gage or piezoelectric or magnetostrictive torque transducer. Similarly, some other form of display driver could be used in place of microprocessor 88. For example, an application specific integrated circuit (ASIC) could be used to drive visual output device 92.

A position sensor 90 also communicates a sensed position to microprocessor 88. Again, various known position sensing devices, including, but not limited to, an optical encoder, a potentiometer, a linear variable differential transformer, an inductosyn, or a Hall-effect Sensor, could provide effective results. Microprocessor 88 is programmed to coordinate the load sensor data and position sensor data and provide an output signal which drives the visual output device 92 as described in greater detail below. Various known visual output devices may be used, including, but not limited to, an LCD display, a CRT display, an LED display, a plasma discharge display, or an elctroluminescent display. The resultant display takes the form of the display shown in FIG. 4 or, alternatively, FIG. 3.

Figure 7A:
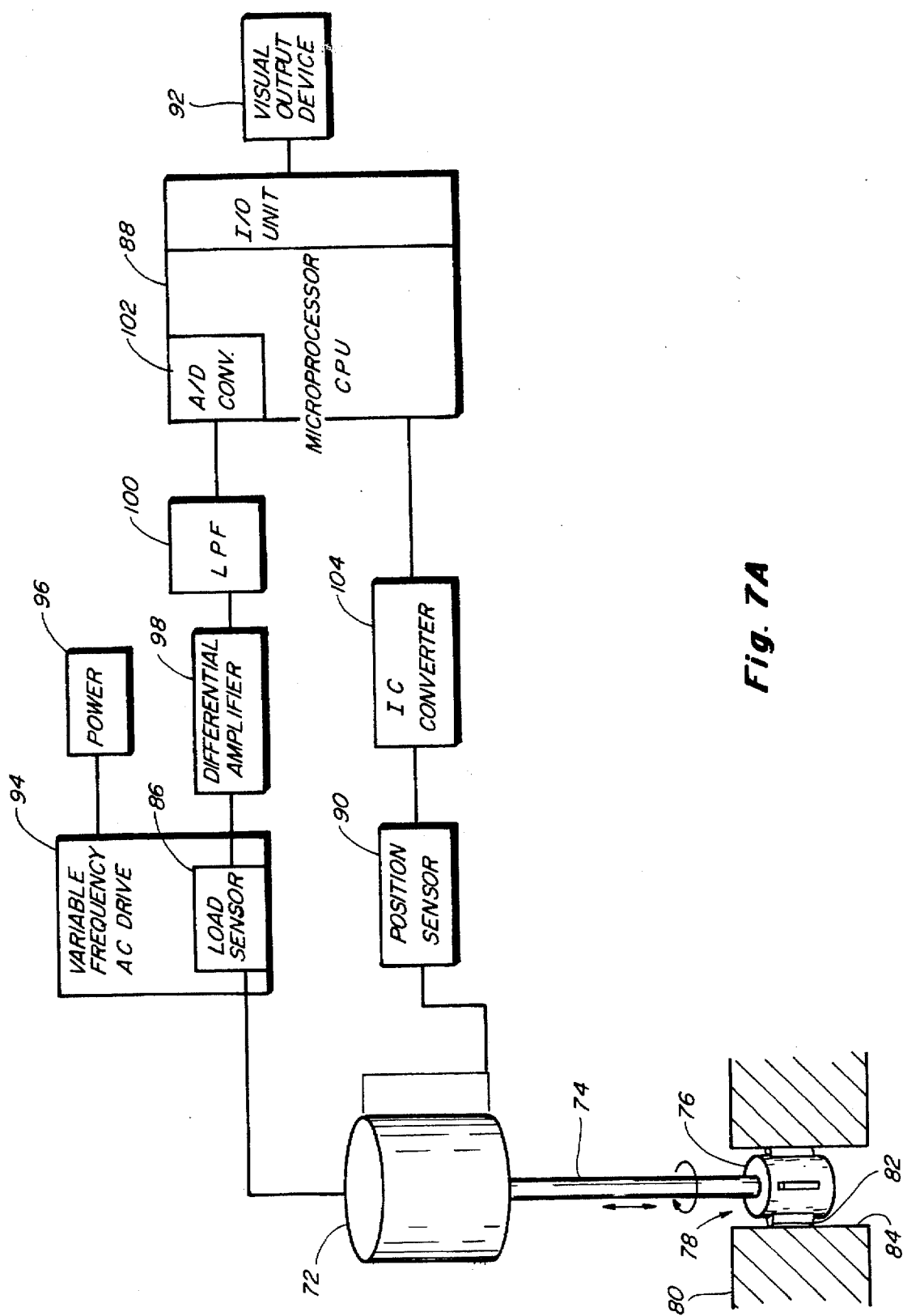
FIG. 7A is an illustration of a first implementation of the display device of the present invention in a vertical honing machine operation.

FIG. 7A is an illustration of the display device as implemented in a vertical honing machine operation. Load sensor 86 is incorporated into a variable frequency AC drive 94 which is powered by power source 96. Load sensor 86 delivers a 0 to 5 volt analog signal to a differential amplifier 98 with a gain of one, providing noise rejection and isolating the sensed load. The load signal then passes through a low-pass filter 100, such as a two pole Butterworth filter with a cutoff frequency of 20 Hz, before reaching microprocessor 88. Microprocessor 88 includes a built in analog to digital converter 102 which then converts the zero to five volt load signal into a byte. Position sensor 90 includes a 200 pulse-per-revolution quadrature encoder that is mechanically linked to the stroking mechanism. The encoder pulses travel to an integrated circuit 104 which translates the pulses into a two-byte digital word that can be read by microprocessor 88. The digital word is a value between 0 and 799 and is proportional to the number of degrees of travel of a drive shaft in the stroking mechanism. Half of the range, 400 values, of the digital word represent the down stoke and the other half represent the up stroke, such that the same axial position of honing tool 76 within bore 78 is represented by two different digital words depending on which axial direction honing tool 76 is traveling.

Figure 7B:
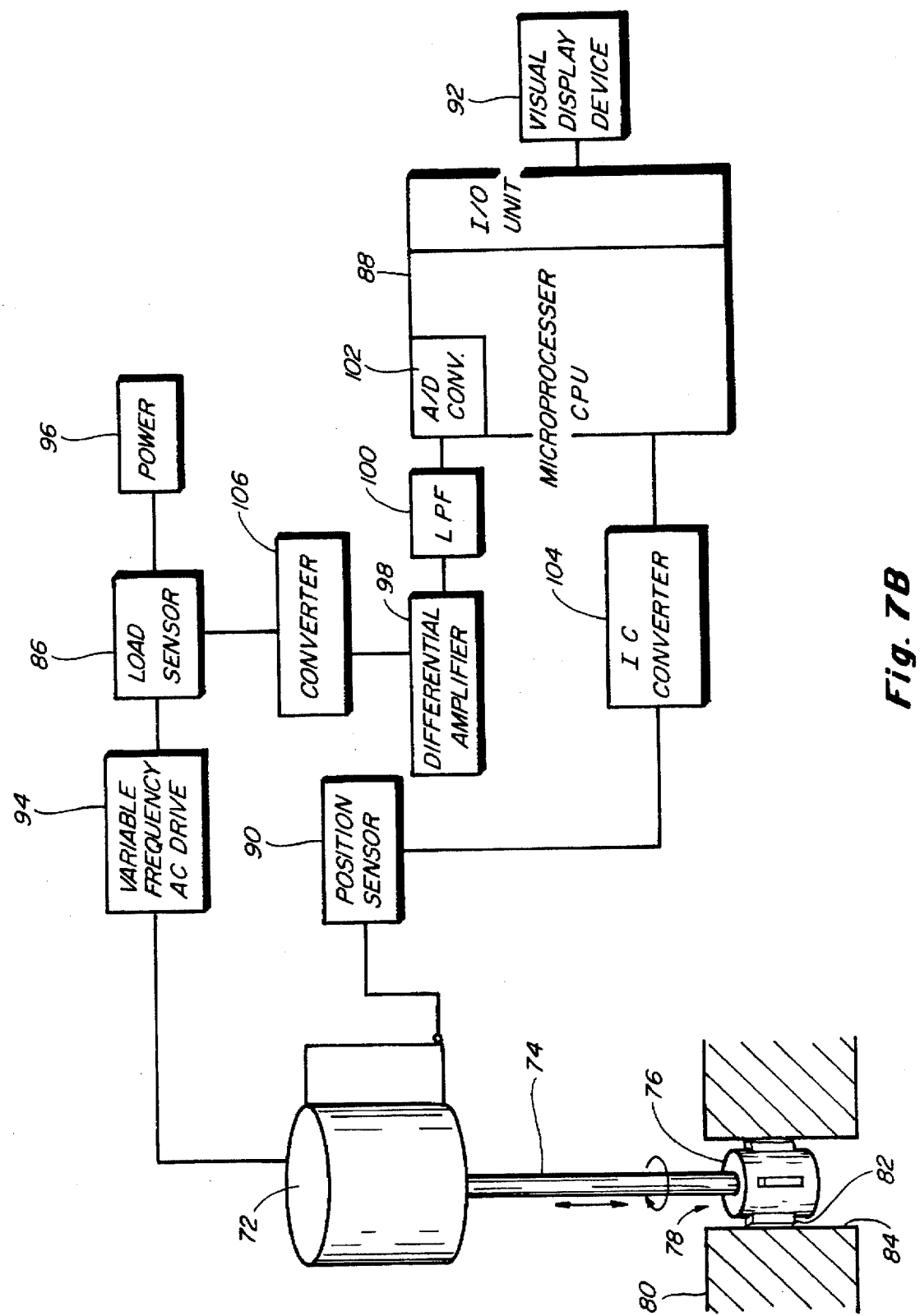
FIG. 7B is an illustration of a second implementation of the display device of the present invention in a vertical honing machine operation.

FIG. 7B illustrates another implementation of the display device in a vertical honing machine operation. In this implementation load sensor 86 includes a single-phase Watt transducer to read power going into AC drive 94. The resulting signal is a 4 to 20 mA current which passes through a converter 106 which converts the signal to a 1 to 5 volt signal before entering differential amplifier 98. Converter 106 is a 250 ohm resistor and the signal entering differential amplifier 98 is a voltage measured across the resistor.

Figure 8A:
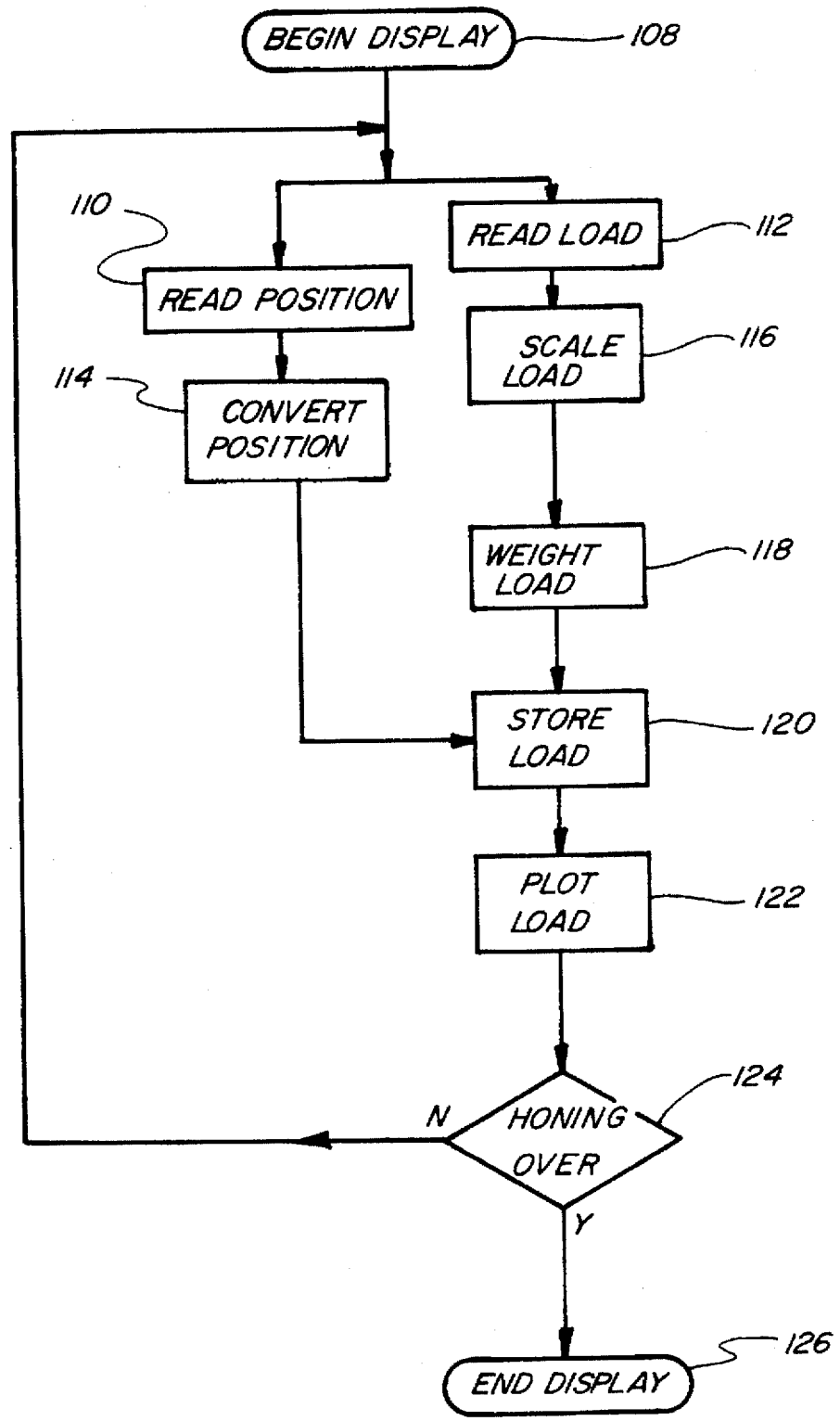
FIG. 8A is a flowchart illustration of the microprocessor.

Microprocessor 88 processes the load and position data similarly for both embodiments FIG. 7A and FIG. 7B. FIG. 8A is a flow chart illustration of microprocessor 88 processing. The flow chart starts with begin display block 108 which triggers read blocks 110 and 112. Position read block 110 reads the position data signal while load read block 112 reads the load data signal. The rate at which microprocessor 88 reads the load and position data should be fast enough for a given stroke rate to plot a sufficient number of load lines 50, see FIGS. 3A and 3B, to provide a representation of bore 78. The position and load signals are then modified in blocks 114, 116 and 118. Conversion block 114 converts the digital word representing position to a number between 0 and 99, representing the relative position of honing tool 76 within bore 78, regardless of axial stroke direction. The converted position number 0 represents the top of the stroke or the top of bore 78 and the converted position number 99 represents the bottom of the stroke or the bottom of bore 78. Scaling block 116 scales the byte representing load to a number between 0 and 128 and any background or offset in the load byte is subtracted out so that when there is no cutting load on the machine, the load byte will be 0.

With respect to the scaled load values, it may be necessary to further adjust the values due to variances caused by the different stroke directions. For example, in the embodiments illustrated in FIG. 7A and FIG. 7B, the sensed load data for a particular axial bore position on a down stroke is different than the sensed load data at the same position on an up stroke. If the difference is large enough, the display fluctuates as honing tool 76 strokes up and down and the displayed profile appears to move inward and outward with respect to imaginary axis 66, as best visualized in FIG. 4. It has been determined that the mount of fluctuation can be sufficiently, but not excessively, reduced by programming the microprocessor to weight the scaled load in weighting block 118 according to the following formula:

$$\text{Weighted Value} = \frac{\text{Scaled Value} + 3(\text{Old Stored Value})}{4}$$

Storing block 120 then stores the weighted load value in a table. The stored value is indexed in the table by the converted position value.

Plotting block 122 then plots the stored load value to an LCD display screen where it is displayed as a series of contiguous horizontal pixels forming a horizontal bar graph. The vertical location of the bar graph on the LCD screen is determined from the data table index value. The plotting routine is described in greater detail below with reference to FIG. 8B. Decision block 124 determines whether or not to continue reading position and load values. If the honing operation is still in progress, the position and load values are read, processed, and plotted again, but if the honing operation is completed the routine ends as indicated by end block 126.

Figure 8B:
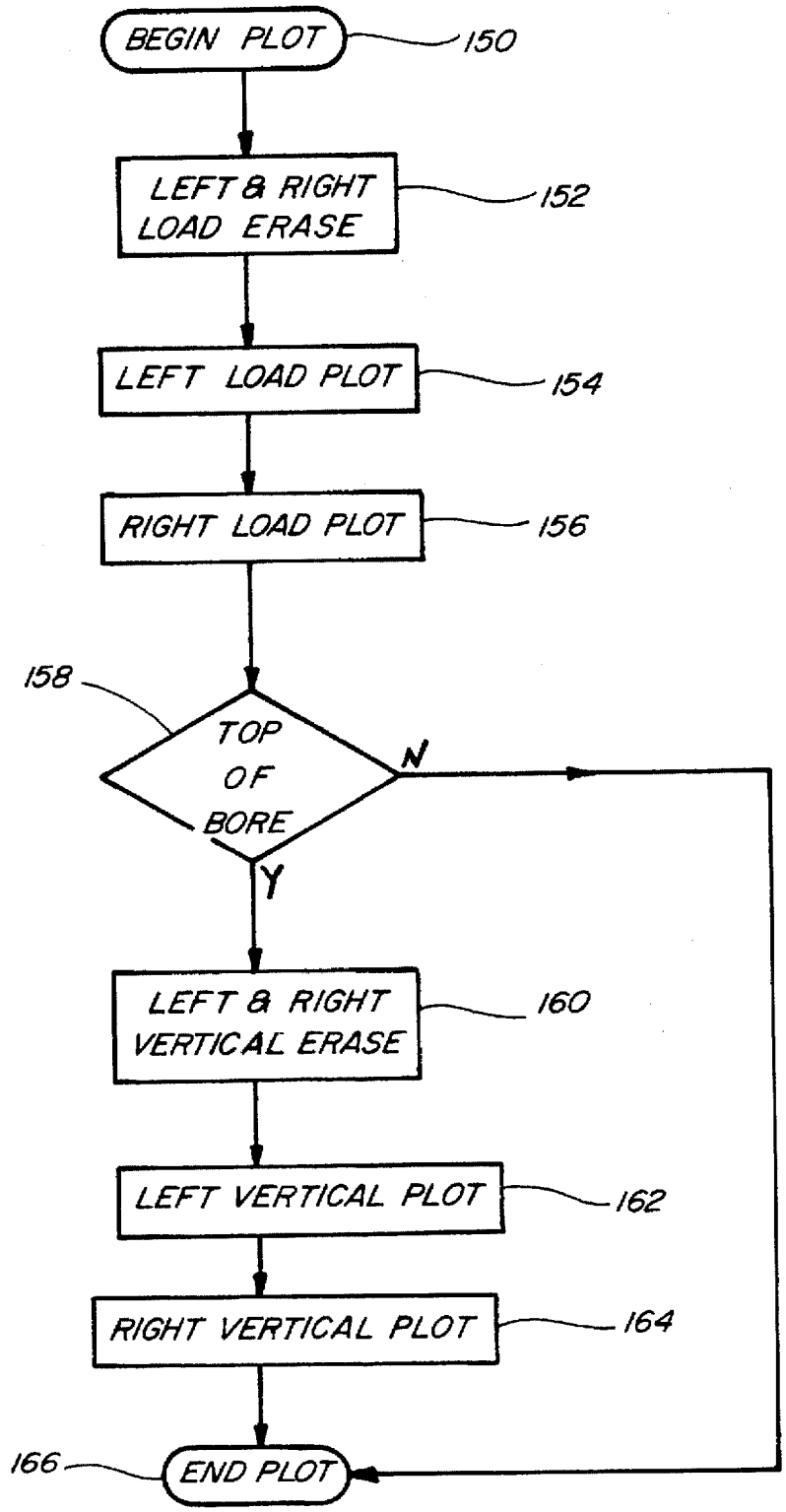
FIG. 8B is a flowchart illustration of the microprocessor control of the visual output device.

FIG. 8B is a flowchart illustration of the plotting operation for a display in accordance with the display shown in FIG. 4. Begin plotting block 150 signals the start of the plotting operation. Erasing block 152 then erases the load line 50 displayed on the left and right hand sides of the screen, which remain from the last plotting for the indexed position. Plotting block 154 plots the new stored load value from left to right in place of the load value just erased on the left hand side of the screen. Plotting block 156 then plots the new stored value from right to left in place of the load value erased on the right hand side of the screen. After the left and right plots, decision block 158 determines whether or not the indexed position represents the top of bore 76. If so, erasing block 160 erases the previous left and right vertical peak line 68 and plotting block 162 plots a new left vertical peak line. Similarly, plotting block 164 plots a new right vertical peak line. The plotting operation is then completed as indicated by end block 166.

The plotting operation described above results in a display according to FIG. 4. Honing machine operators can utilize the display during a honing operation to easily achieve a predetermined final bore profile as previously described. Honing machine operators need only observe the display of the present invention when performing a honing operation and consequently the skill and attention level required of operators is reduced and the ability of operators to uniformly hone numerous parts is increased.

From the preceding description of the present invention, it is evident that the objects of the invention are attained. In particular, a machine tool display of a working surface profile as it is being machined is provided. Further, a machine tool graphical display which continuously displays machine tool load verses position is provided.

Although the invention has been described and illustrated in detail, it is to be clearly understood that the same is intended by way of illustration and example only and is not to be taken by way of limitation. For example, it is contemplated that the graphical display of the present invention is not limited to vertical honing machine applications and could be incorporated into other machine tool applications including horizontal honing machines as well as vertical and horizontal grinding machines, including various tools for removing material from working surfaces. Further, it is contemplated that the block diagram illustrations of FIG. 7A and FIG. 7B are illustrative only and that there are numerous possible configurations for implementing the present invention. Similarly, the flow charts of FIG. 8A and FIG. 8B are also representative of numerous possible programming routines which could be implemented to plot the display of the present invention. It is also contemplated that the displayed load value could be determined from the motor which operates tool stroking. Further, the displayed load value could be determined based on a combination of the loads on the spindle motor and the stroking motor. In addition, each displayed load value could be an average of more than one instantaneous load value. Accordingly, the spirit and scope of the invention are to be limited only by the terms of the appended claims.

What is claimed is:

1. A display device configured for a machine having a tool which removes material from a work surface having an axial length, where an axial position of the tool relative to the work surface varies, the machine including a load sensor for sensing a load on the machine as material is removed from the work surface and a position sensor for sensing the axial position of the tool, said display device comprising:

a visual output device, and a display driver connected to said visual output device so that said visual output device provides a continuous display of the load as a function of the axial position.

2. The display device of claim 1 wherein said visual output device comprises an LCD display.

3. The display device of claim 1 wherein said visual output device comprises a CRT display.

4. The display device of claim 1 wherein said visual output device comprises an LED display.

5. The display device of claim 1 wherein said display driver comprises a microprocessor.

6. The display device of claim 3 wherein said display driver comprises an ASIC.

7. A display device configured for use on a machine having a tool which engages a work surface and removes material therefrom, where the axial position of the tool relative to the work surface varies, the machine including a load sensor for sensing load on the machine as material is removed from the work surface and a position sensor for sensing axial position of the tool, said display device comprising:

a visual output device; and a display driver operatively connected to said visual output device so that, during a machining operation, said visual output device displays the machine load verses the tool position for a plurality of tool positions to provide a representation of the profile of the work surface.

8. The display device of claim 7 wherein the work surface is the interior surface of a bore and said representation of the profile of the work surface is a representation of the cross-sectional profile of the bore.

9. The display device of claim 7 wherein said display driver comprises a microprocessor.

10. The display device of claim 7 wherein said display driver comprises an ASIC.

11. A machine for removing material from a work surface, the work surface having an axial length, said machine comprising:

a tool for engaging the work surface and removing material therefrom, an axial position of said tool relative to the work surface varying, a load sensor for sensing a load on the machine, a position sensor for sensing the axial position of said tool, a visual output device, a display driver connected to said visual output device so that said visual output device provides a continuous display of the load verses the axial position.

12. The machine of claim 11 wherein the machine is a honing machine and the work surface is a bore being honed.

13. The machine of claim 11 wherein the machine further comprises means for adjusting the axial position of said tool relative to the work surface during machine operation.

14. The machine of claim 13 wherein said means for adjusting the axial position of said tool relative to the work surface includes manual means.

15. The machine of claim 13 wherein said means for adjusting the axial position of said tool relative to the work surface includes a microprocessor connected to respond to the load and to the axial position.

16. The machine of claim 13 wherein said means for adjusting the axial position of said tool relative to the work surface includes means for moving the work surface.

17. The machine of claim 13 wherein said means for adjusting the axial position of said tool relative to the work surface includes means for moving the axial position of said tool.

18. The machine of claim 11 wherein said display driver comprises a microprocessor operatively connected to said visual output device.

19. The machine of claim 11 wherein said display driver comprises an ASIC operatively connected to said visual output device.

20. The machine of claim 11 wherein said visual output device comprises an LCD display.

21. A method of displaying a load of a machine having a tool which engages a work surface removing material therefrom, the work surface having an axial length, the machine including a motor, said method comprising the steps of:

sensing the load, sensing the axial position of the tool, continuously displaying the load as a function of the axial position of the tool on a visual output device.

22. The method as defined by claim 21 wherein said step of sensing the load comprises sensing a load on the motor.

23. The method as defined by claim 22 wherein the motor rotates the tool.

24. The method as defined by claim 22 wherein the motor axially moves the tool.

25. The method as defined by claim 21 wherein said step of sensing the load comprises sensing a mechanical torque of the machine.

26. The method as defined by claim 21 wherein said step of sensing the axial position of the tool comprises sensing the axial movement of the tool.

27. The method as defined by claim 21 wherein said step of sensing the axial position of the tool comprises sensing the axial position of the tool relative to the work surface by sensing the axial movement of the work surface.

28. The method as defined by claim 21 wherein said step of continuously displaying the load as a function of the axial position comprises displaying a first axis representing the axial position and displaying a second axis representing the load, said second axis displayed perpendicular to said first axis.

29. The method as defined by claim 28 wherein said first axis is displayed as a vertical axis and said second axis is displayed as a horizontal axis.

30. The method as defined by claim 28 wherein said first axis is displayed as a horizontal axis and said second axis is displayed as a vertical axis.

31. The method as defined by claim 28 wherein said step of continuously displaying the load as a function of the axial position further comprises displaying a mirror image of the load and the axial position about a third axis which is parallel to said first axis.

32. The method as defined by claim 28, which further comprises the step of:

displaying a peak load line, said peak load line displayed parallel to said first axis.

33. The method as defined by claim 28 wherein said step of continuously displaying the load as a function of the axial position further comprises displaying a plurality of load lines extending from said first axis and parallel to said second axis.

34. The method as defined by claim 21 wherein said step of continuously displaying the load as a function of the axial position comprises feeding the load and the axial position into a display driver which is connected to and controls the visual output device.

35. The method as defined by claim 21 wherein said step of continuously displaying the load as a function of the axial position comprises scaling the load and displaying the scaled load value.

36. The method as defined by claim 21 wherein said step of continuously displaying the load as a function of the axial position comprises displaying the load on a percentage scale.

37. A method of honing a bore in a workpiece, the bore including an axial length, said method comprising the steps of:

axially stroking and rotating a honing tool within the bore, said honing tool engaging an interior surface of the bore, removing material from said interior surface, sensing a load of the honing machine while said honing tool engages said interior surface, sensing an axial position of said honing tool relative to said bore axial length while said honing tool engages said interior surface, and continuously displaying a profile of the bore during the honing operation.

38. The method as defined by claim 37 wherein said step of continuously displaying a profile of the bore comprises graphically displaying said load of the honing machine as a function of said axial position of said honing tool on a visual output device.

39. The method as defined by claim 37, which further comprises the step of:

adjusting the stroking action of said honing tool with respect to said bore axial length so that more material is removed from a first axial portion of said bore interior surface than is removed from a second axial portion of said bore interior surface, wherein said first axial portion has a smaller diameter than said second axial portion.

40. The method as defined by claim 39 wherein said step of adjusting the stroking action of said honing tool with respect to said bore axial length comprises pausing the stroking action of said honing tool.

41. The method as defined by claim 39 wherein said step of adjusting the stroking action of said honing tool with respect to said bore axial length comprises moving the workpiece.

42. The method as defined by claim 39 wherein said step of adjusting the stroking action of said honing tool with respect to said bore axial length comprises changing the stroke length of said honing tool.

43. A machine for removing material from a work surface, the work surface having an axial length, said machine comprising a tool for engaging the work surface and removing material therefrom, an axial position of said tool relative to the work surface varying as the material is removed, load sensing means for sensing a load on said machine as the material is removed, position sensing means for sensing an axial position of said tool relative to the work surface, means for coordinating a sensed load with a corresponding sensed position, and means for displaying a plurality of sensed loads, each sensed load displayed relative to its corresponding sensed position and in an orientation which provides a representation of the profile of the work surface.

44. The machine of claim 43 wherein the work surface is a bore, said machine comprising a honing machine including a spindle motor operatively connected to said tool for rotating said tool, a stroking motor for providing relative movement of said tool with respect to the work surface, wherein said load sensing means comprises a motor load sensor for sensing a load on at least one of said motors.

* * * * *

UNITED STATES PATENT AND TRADEMARK OFFICE
CERTIFICATE OF CORRECTION

PATENT NO. : 5,663,886
DATED : September 2, 1997
INVENTOR(S) : Keith W. Lueck

It is certified that error appears in the above-identified patent and that said Letters Patent is hereby corrected as shown below:

Col. 2, line 18, "mount" should be -- amount -- .

Col. 3, line 45, "Vertical" should be -- vertical -- .

Col. 6, line 56, "axially," should be -- axially -- .

Col. 7, line 40, "Sensor" should be -- sensor -- .

Col. 8, line 48, "mount" should be -- amount -- .

Signed and Sealed this

Sixth Day of January, 1998

Attest:

BRUCE LEHMAN

*Attesting Officer*   *Commissioner of Patents and Trademarks*